Jan. 24, 1933. G. KARL 1,895,251
THEFT PREVENTING DEVICE
Filed Oct. 2, 1931
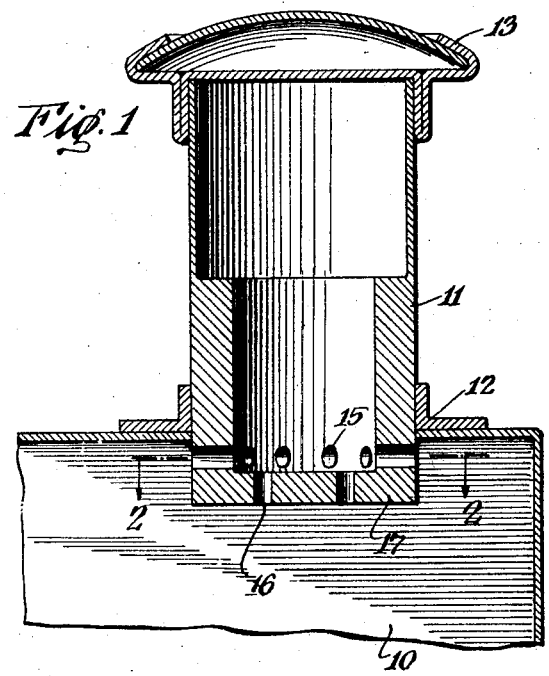
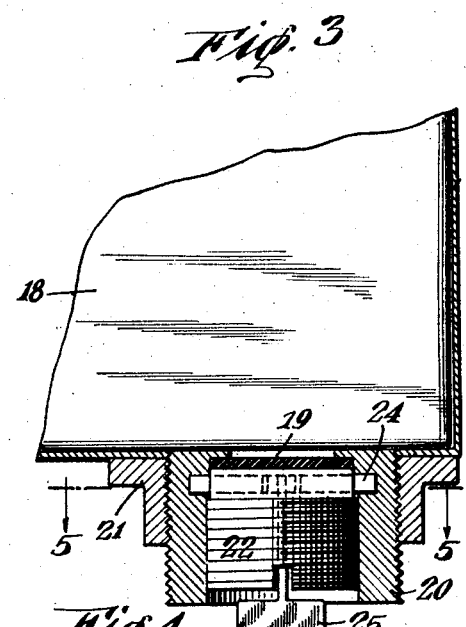
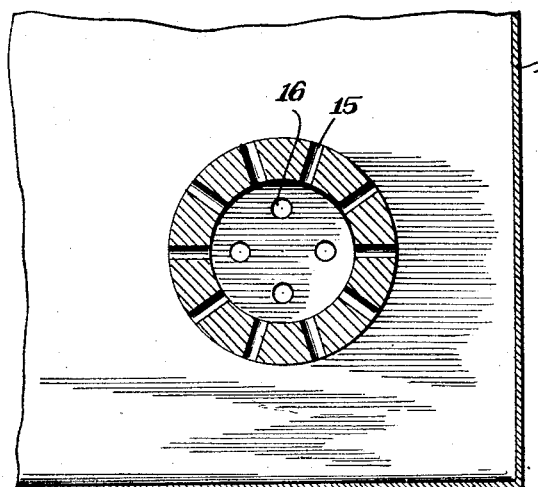
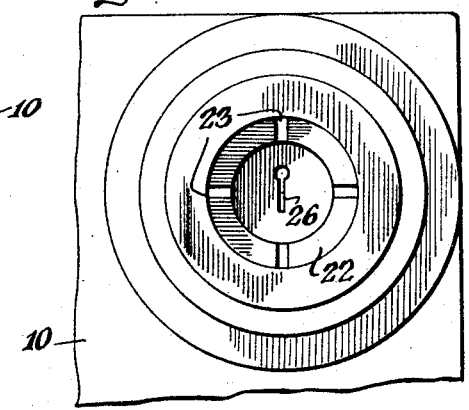
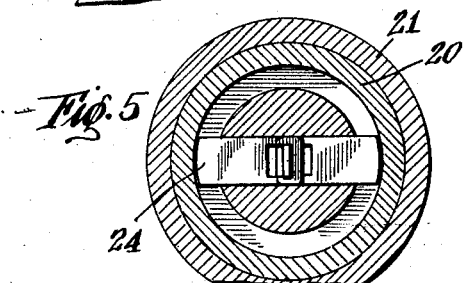
INVENTOR
George Karl
BY
ATTORNEY Patented Jan. 24, 1933

1,895,251

UNITED STATES PATENT OFFICE

GEORGE KARL, OF ALTOONA, PENNSYLVANIA

THEFT PREVENTING DEVICE

Application filed October 2, 1931. Serial No. 566,440.

This invention relates to improvements in theft preventing devices, particularly to a device for preventing the theft of gasoline from tanks, and it is the principal object of my invention to provide a device allowing the filling of a tank with fuel without fully opening the filler nozzle thus preventing an unauthorized withdrawal of the fuel from its tank.

Another object of my invention is the provision of a device for preventing the theft of a liquid fuel such as gasoline from the tanks of cars etc., either through the filler nozzle of the tank or through the drain opening.

A further object of my invention is the provision of a theft preventing device of the aforedescribed character of comparatively simple and inexpensive construction, yet highly efficient in operation and adapted to be installed with any tank without the necessity of materially changing its construction.

A still further object of my invention is the provision of a theft preventing device for the drain opening of fuel tanks by closing the same by means of a plug equipped with latches operated by a special key.

These and other objects of my invention and advantages thereof will appear as the description thereof proceeds and will then be more specifically defined in the appended claim.

In the accompanying drawing forming a material part of this disclosure:

Fig. 1 is a fragmentary sectional view of a tank equipped with a fuel theft preventing device constructed according to my invention on the filler opening of the tank.

Fig. 2 is a transverse sectional view taken on line 2—2 of Figure 1.

Fig. 3 is a fragmentary sectional view of a tank equipped with a fuel theft preventing device arranged at the drainage opening of the tank.

Fig. 4 is a bottom plan view thereof.

Fig. 5 is a sectional view taken on line 5—5 of Figure 3.

As illustrated, a fuel tank 10 has its filling opening closed by a hollow stem or body 11 held on the tank by a flanged collar 12 and having its upper end normally closed by a removable cap 13.

The lower end of the stem is provided with a plurality of radial bores 15 in its wall and openings 16 in its bottom 17, these bores and openings communicating with the tank.

In operation, the tank after the removal of cap 13 may be filled through the bores 15 and openings 16, but it will be impossible to extract any of the fuel through the openings without great difficulty.

As shown in Figures 3 to 5 the tank 18 has a drain opening 19 in its bottom and a socket 20 attached thereto by a flanged collar 21.

A plug 22 is held in the socket 20 having a plurality of radial bores 23 through which a pair of opposed bolts 24 extend into suitable notches in the inner wall of socket 20. These bolts, which are rectangular in cross section overlap at their inner ends and their overlapping portions contain registerable recesses for the reception of a key by which the bolts may be extended or retracted.

The bolts are operated by means of a key 25 introduced through a key hole 26. In operation, the opening 19 is closed by the plug and the person in possession of the keys operates the bolts to hold the plug in its position closing the opening. It will be impossible to operate the bolts to expose the opening 19 and thus prevent drainage of the fuel from the tank by unauthorized persons.

It will be understood that I have described the preferred forms of my invention only as examples and that I may make such changes in the general arrangement of my device and in the construction of its minor details as come within the scope of the appended claim without departure from my invention.

Having thus described my invention what I claim as new and desire to secure by Letters Patent is:

In a closure for the drain opening of tanks, a socket having a plurality of notches in its inner wall and attached to the tank, a plug in said socket having a plurality of radial bores, said plug normally closing the drain opening and a pair of opposed bolts slidable transversely in said plug and having inner overlapping ends provided with aligned openings the outer ends of said bolts being engageable with the notches in the inner wall of the socket, said plug having an axial key-hole for the introduction of a key operating the bolts.

In witness whereof I have signed my name to this specification.

GEORGE KARL.